(12) United States Patent
McMain

(10) Patent No.: US 8,469,819 B2
(45) Date of Patent: Jun. 25, 2013

(54) GAME APPARATUS AND GAME CONTROL METHOD FOR CONTROLLING AND REPRESENTING MAGICAL ABILITY AND POWER OF A PLAYER CHARACTER IN AN ACTION POWER CONTROL PROGRAM

(76) Inventor: Michael Parker McMain, Cumming, GA (US)

( * ) Notice: Subject to any disclaimer, the term of this patent is extended or adjusted under 35 U.S.C. 154(b) by 596 days.

(21) Appl. No.: 12/792,724

(22) Filed: Jun. 2, 2010

(65) Prior Publication Data

US 2010/0311503 A1  Dec. 9, 2010

Related U.S. Application Data

(60) Provisional application No. 61/183,969, filed on Jun. 4, 2009.

(51) Int. Cl.
*G06F 17/00* (2006.01)
(52) U.S. Cl.
USPC .................................. 463/42; 463/1; 463/23
(58) Field of Classification Search
USPC ................................. 463/42, 23, 1
See application file for complete search history.

(56) References Cited

U.S. PATENT DOCUMENTS

| | | |
|---|---|---|
| 5,190,285 A | 3/1993 | Levy et al. |
| 5,720,619 A | 2/1998 | Fisslinger |
| 6,208,357 B1 | 3/2001 | Koga et al. |
| 6,217,444 B1 | 4/2001 | Kataoka et al. |
| 6,354,940 B1 | 3/2002 | Itou et al. |
| 6,409,604 B1 | 6/2002 | Matsuno |
| 6,488,582 B1 | 12/2002 | Suzuki |
| 6,533,663 B1 | 3/2003 | Iwao et al. |
| 6,758,756 B1 | 7/2004 | Horigami et al. |
| 6,967,566 B2 | 11/2005 | Weston et al. |
| 2005/0143173 A1 | 6/2005 | Barney et al. |
| 2006/0039016 A1 | 2/2006 | Harrison, Jr. |
| 2006/0205460 A1 | 9/2006 | Shimosato et al. |
| 2007/0087801 A1 | 4/2007 | Kotani et al. |
| 2008/0287175 A1 | 11/2008 | Kusuda et al. |
| 2009/0191968 A1 | 7/2009 | Johnson et al. |

FOREIGN PATENT DOCUMENTS

| | | |
|---|---|---|
| JP | 2002200350 | 7/2002 |
| JP | 2003265691 | 9/2003 |
| JP | 2005006989 | 1/2005 |

*Primary Examiner* — Michael Cuff
(74) *Attorney, Agent, or Firm* — James E. Larson

(57) ABSTRACT

A game apparatus and game control method for controlling and representing magical ability and power of a player character, in an action power control program is provided. The game apparatus and game control method permits the accessing of an unlimited level of magical power available to the player character by affecting a control button on the input device, which then allows for a determination to be made on a proper amount of the unlimited level of magical power based upon the player character's known abilities and vitality to be used, which then in turn permits utilization of said proper amount of the unlimited level of magical power against at least one other character within the video game to obtain a desired result against said at least one other character before a detrimental effect causes a penalty to the player character.

15 Claims, 20 Drawing Sheets

AVATAR

HEALTH

FATIGUE

MAGICAL ABILITIES/POWERS

ENEMY  AVATAR (IN COMBAT)

HEALTH

FATIGUE

MAGICAL ABILITIES/POWERS

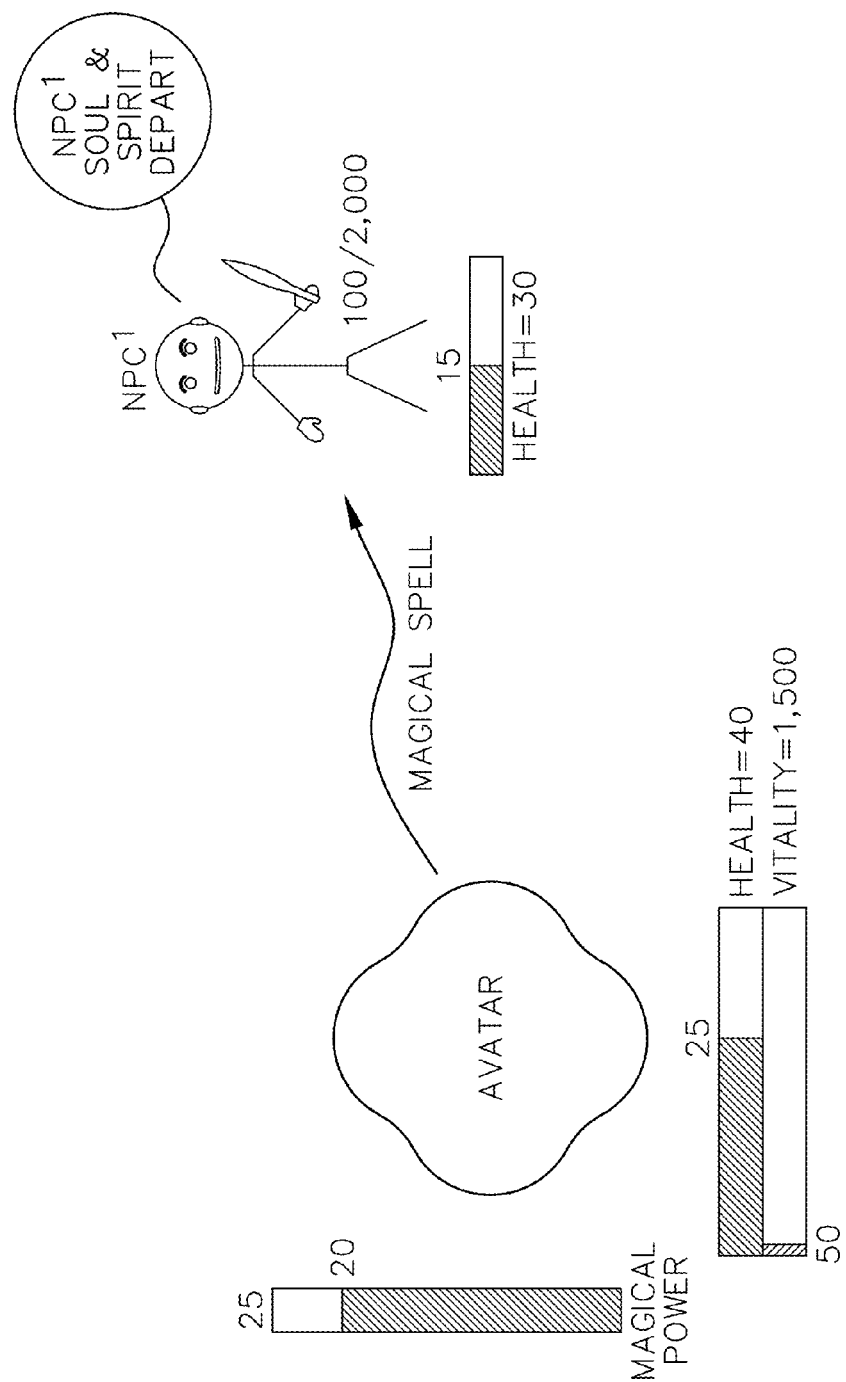

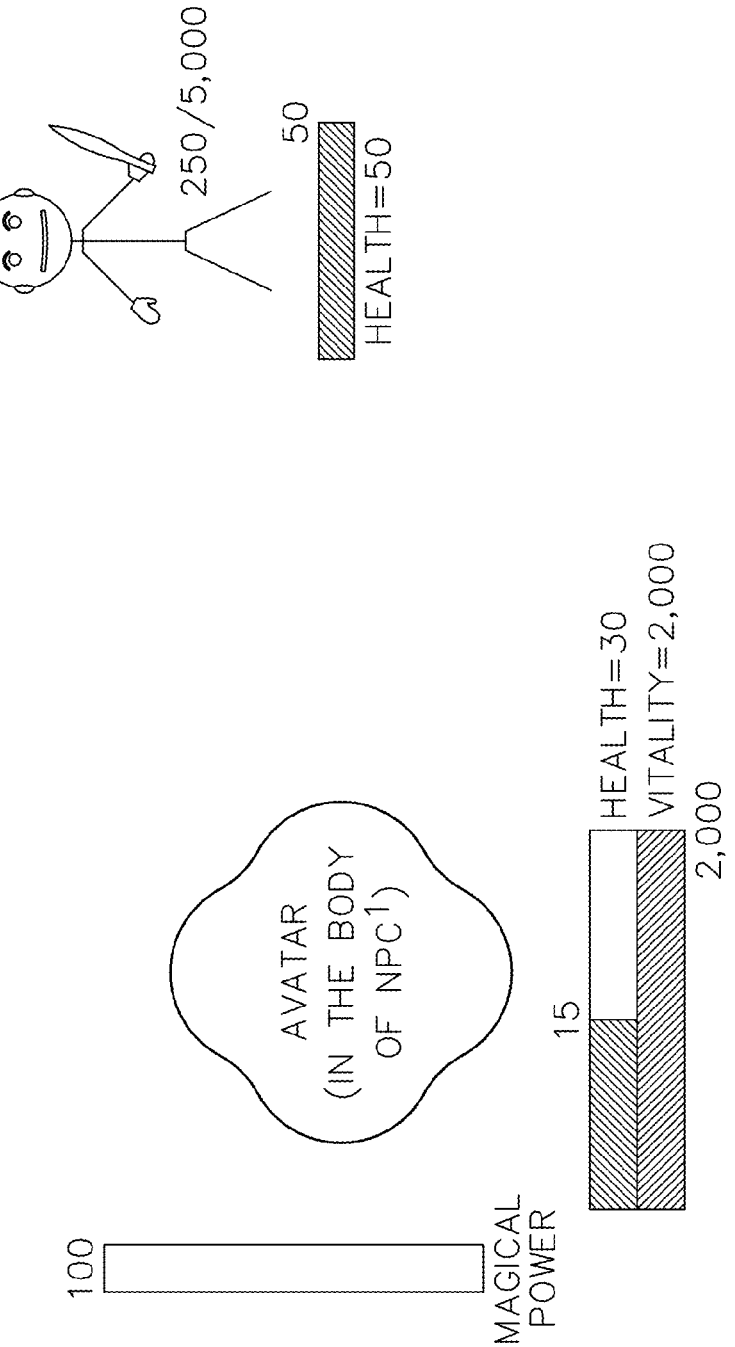

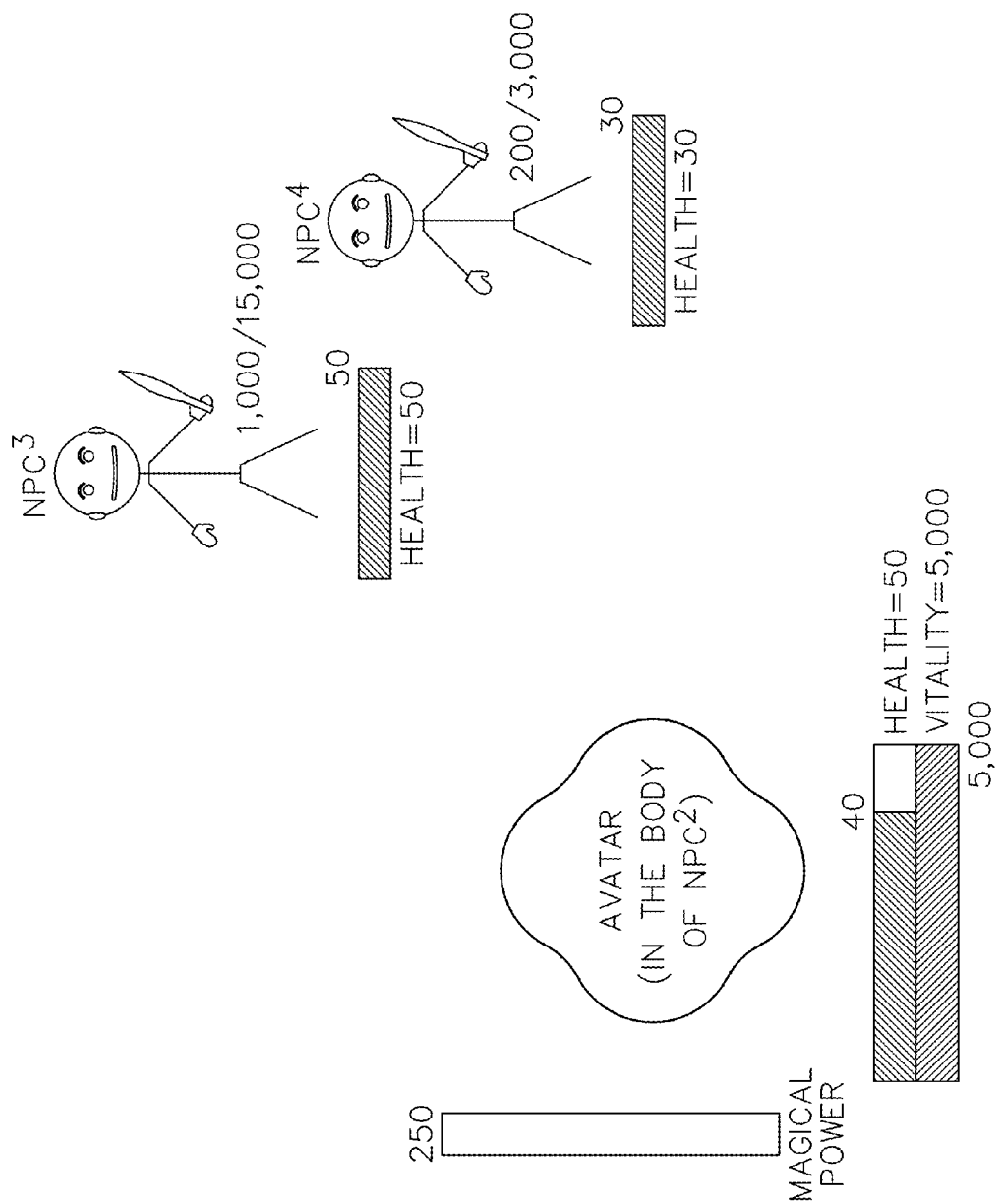

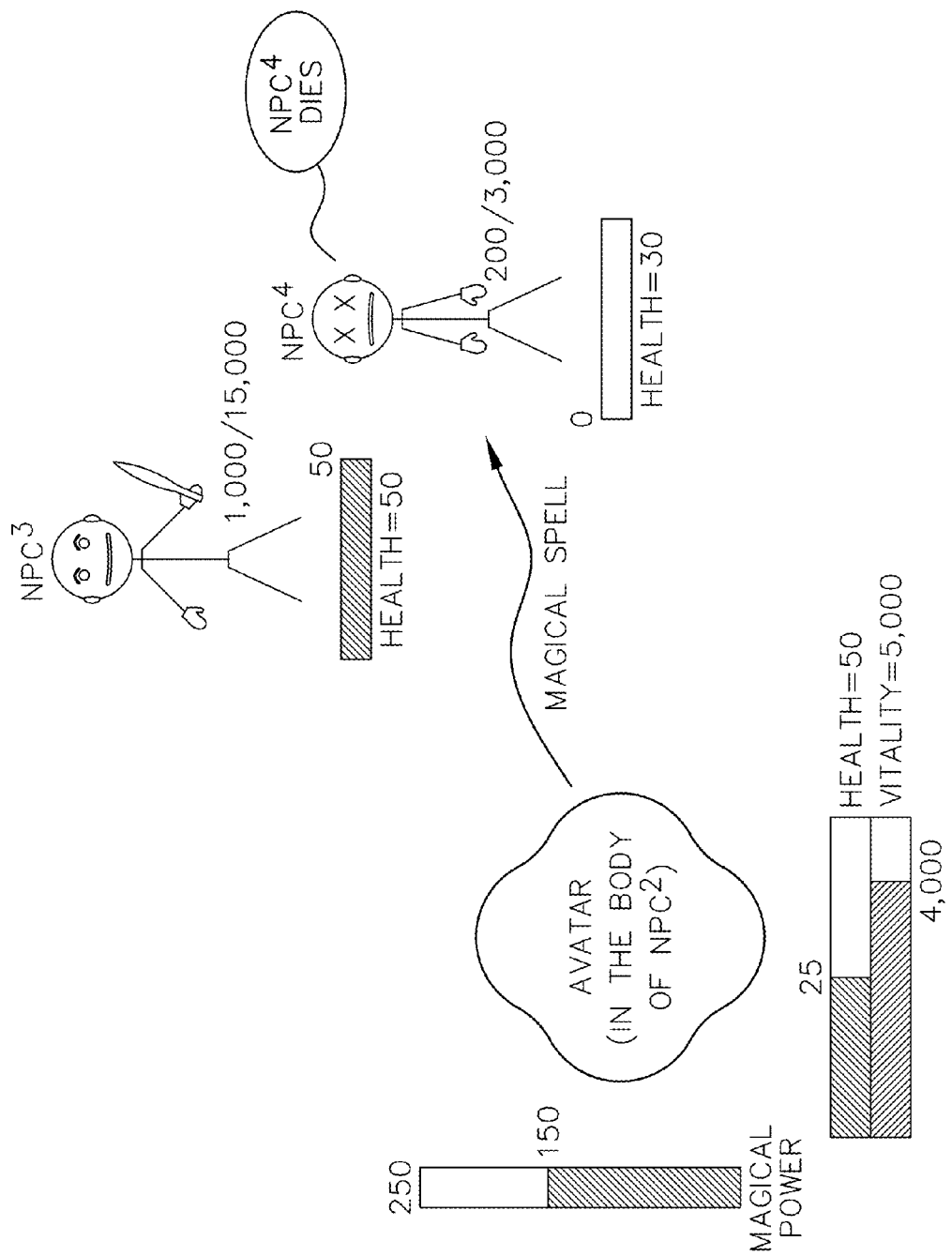

GAME APPARATUS AND GAME CONTROL METHOD FOR CONTROLLING AND REPRESENTING MAGICAL ABILITY AND POWER OF A PLAYER CHARACTER IN AN ACTION POWER CONTROL PROGRAM

PRIOR APPLICATIONS

This application is a continuation-in-part of provisional patent application No. 61/183,969, filed Jun. 4, 2009.

BACKGROUND OF THE INVENTION

1. Field of Invention

The present invention relates to video games. More particularly, the present invention relates to a game apparatus and game control method for controlling magical ability, prowess and power of a player character in a video game, which constantly provides a representative indicator of such magical abilities, prowess and/or power on a video display apparatus, and wherein an unlimited amount of said abilities is constantly available to the game player, and therefore the player character. However, these unlimited amounts of abilities can inflict a detrimental effect on the player character based upon the current state of being for any given character thereby requiring that the game player balance these abilities for his player character based upon a desired or necessary course of action or need to achieve a specific result, which benefits the game player of the video game, regardless of whether the player character survives in a virtual basis on the video display apparatus.

2. Description of the Prior Art

Video games for home use were first introduced in the early 1970's. Throughout the 1970's and 1980's the industry saw substantial and profitable growth. However, in the late to mid 1990's and through-out the first decade of the twenty-first century the industry has seen incredible growth that has made the it into a $10 billion industry, which rivals the motion picture industry as the most profitable entertainment industry in the world.

Part of this explosive growth has been a result from moving away from PC-based games to those played on gaming consoles such as Microsoft's X-Box™ and Sony's Playstation™ as well as online gaming over the Internet. However, another large part of this expansive growth has been due to the realistic and near-virtual abilities of the games and the processing power of the gaming consoles. Even though many of the games employ abilities, which defy the laws of physics and actual human capabilities, the realistic graphics and visual effects continue to awe "gamers" to play these video games to ever reaching levels.

Many well known video games are based upon real characters from history, while others emanate from mythology, while still others are created as fanciful characters by gaming industry developers and story writers. In an attempt to make a game more appealing to gamers, new and innovative attributes of each game are constantly invented. These include the powers and abilities of both the non-player characters (also known as an "NPC") as well as the player characters of the gamer (also known as the "avatar").

Avatars are a video game player's representation of himself (an alter ego) in the form of a three-dimensional model in a virtual world. Avatars are the basis of computer role playing games (called a "CRPG" or more often just "RPG"), wherein the computer player defines his or her actions based upon decisions made from a selection of pre-defined choices within the game programmed by the game developers. However, as can be understood, the course of the game and the eventual goal or outcome of the game is essentially incalculable due to the fact that different computer game players will instinctively make different choices (also known as "character advancement"). Further, since the avatar is in a virtual world, the abilities of such can be endless and are only limited by the expansive imagination of today's video game programmers.

One well known example of a popular RPG wherein an avatar is used is the game entitled Grand Theft Auto™. In this game, the avatar more closely resembles the abilities of an actual real life person and does not possess powers that defy the known laws of physics. The avatar steals cars, using violence, and is constantly being chased by the police. However, in other games, wherein the laws of physics are defied, an avatar may have the ability to obtain magical power and to cast magical spells within a game as it progresses for the purpose of achieving some desired result. One such example is the game Oblivion™, which takes place in a mythological world full of demons and monsters in conjunction with human beings and various hybrids thereof. In games such as this, the types of magic that can be obtained and the spells that can be cast seem endless as new and innovative ideas continue to emerge year after year within the video gaming industry. Regardless of the magic obtained or sought after, almost all video games of this genre use a scenario wherein the game player must achieve some task. This may be to travel through some distance in real time, escape from a particular location, defeat an enemy or attacker, find some hidden box, chest or treasure or take away some power from another character, whether that other character is another avatar within a multiplayer game environment or whether he is a non-player character programmed within the game.

These magical abilities are typically stored by the avatar for later use, when needed. The use of such magical powers may require the casting of a spell by mixing together different ingredients obtained within the game or from merely using a device or an inherent power that is now part of the avatar's character. Examples of magical powers include, but are not limited to, making oneself indestructible against an enemy's power or some encountered natural environmental condition (i.e., freezing cold temperatures), making oneself invisible, throwing fire or other similar destructive natural occurring forces, moving objects out of the way, tele-transportation of oneself, shape shifting and temporary enhanced physical ability and stature.

A typical example of how magical abilities, along with health and fatigue, are represented in a video game power control program can be seen in FIGS. 1 and 2, appropriately labeled as "Prior Art." As seen in FIG. 1, an avatar is represented having some amount of Health, Fatigue and Magical Abilities/Powers by horizontal bars, wherein the fully hatched bar of this black and white drawing represents "full" Health, Fatigue and Magical Abilities/Powers. In a game, these would be most often represented by color or shades of darkness to indicate a contrast so that it can be seen when a given level drops. In Prior Art FIG. 2, it can now been seen that the avatar is in combat with an enemy, wherein the avatar is sustaining injury and he is also using energy to fight. Therefore, his level of Health and Fatigue are dropping, and the hatching of this black and white drawing is now representing depleted levels of Health and Fatigue. Furthermore, the avatar is tapping into his reserve of Magical Abilities/Powers by casting magic against his enemy in hopes of defeating him. This too is depleting his level of Magical Abilities/Powers as can be seen in the drop along the respective horizontal bar. Again, in the video game on a display screen, these would not be represented by hatching but instead by color or contrast to indicate that these three attributes are dropping.

In these prior art games, it can be seen that these reserve levels are being depleted along a line through the use of a simple liner scale (i.e., the difference between two values is perceived on the basis of the difference in actual values). For example, in the prior art, use of a specific magical spell depletes his Magical Abilities/Powers by a certain pre-programmed set amount decided by the game programmers and developers. Since there is only a set of amount of magic that can be used, the avatar must be careful not to use all of his magical abilities since he may need more in his next enemy encounter. If he uses all of his magical abilities, but is successful in defeating this particular enemy before his health is fully depleted, he will need to scour for more magic to horde and he must do so with traditional combat abilities (i.e., in this example, with his sword alone). The linear scale approach to magical ability depletion, along with the limited amounts of magical power that is available and the need to find more magic before it can be used, is a serious limitation in all prior art video games and action power control programs. Improvement is clearly needed to enhance the video game experiences when operated in a virtual world on a computer or gaming console and displayed on a video screen that is connected thereto.

SUMMARY OF THE INVENTION

I have invented an improved method for controlling and representing magical ability and power of a player character, in an action power control program used on a computer or video game console and controlled by a computing input device. In my method and with my input device, unlimited magical power can be channeled to the player character at any time by use of a gaming console game controller (for example) or any other known computer input device, much like a spigot can be an unlimited source of water. There is no scouring or searching within the virtual world of the video game in my method, which requires the game player to find and horde magical abilities for his player character to have the use of magic. In my method, magic is always available, simply by engaging the spigot through affecting pressure on any one of numerous buttons available on a computing input device, such as a game console controller. However, depending on the game player's character at any given point within the action power control program, the initiation or use of excessive channeled magic to the game character (i.e., turning the spigot to wide open) can cause a detrimental effect to the game character, which then requires the game player to return to a starting point in the action power control program.

Representation of the unlimited magical power and the effects it has on a player character within the action power control program can take many forms. In one embodiment, a computerized graphic on a display screen interfacing with the computer or gaming console that is operating the action power control program represents the unlimited magical power with a flame-like graphic (similar to a "roaring blue" Bunsen burner flame), wherein the inner richly colored blue flame is the magic being channeled to the player character and the outer flame areas of lesser blue color is the amount of effect (damage) that the channeled magic is having on body of the player character utilizing the magic (see FIG. 3). The relationship between these two forces affects how long a player can survive with any given level of magic being channeled and is measured by a level of vitality. The stronger the player character, the more channeled magic he can utilize with lesser effects (i.e., "burn-off") to his body and therefore lesser effects to his vitality (i.e., he can live longer).

In the preferred embodiment if the present invention, employing a first person perspective and utilizing a HUD (a "head-up display"), regardless of the player character's vitality or his capability of channeled magic, there is a 30 second window of opportunity, although other time limits can be employed, to push the unlimited magical power to its highest level for that particular character before he dies due to the depletion of his vitality. It is therefore seen that the loss of vitality can cause death, but it is non-linear, as compared to health as is represented and used to control a player character in a prior art action power control program. Instead, the present invention uses an algorithmic representation based upon player character magical abilities, vitality and current channeled magic through the use of a computing input device. For avoidance of doubt, the use of an algorithmic scale permits a change between two values to be perceived on the basis of the ratio of the two values and not the difference there between.

In an alternate embodiment, employing a third person perspective for the player's avatar, the magical spell spigot is represented on the actual physical body of the game player's avatar (see FIGS. 9 and 10) as a glow emanating from the back of the neck of the player character, which then radiates through the body like veins, although other "on-person" representations can be employed.

Regardless of whether utilizing the preferred or any alternate embodiment of the present invention, power ratings are assigned to the various game characters, of which the avatar is capable of inhabiting or "taking over." The numerical values have ranges and represent a relative power value that is not known to the game player as a numerical number, but instead something he learns from trial and error, which is meant to become intuitive, through use of the magical spell spigot.

It is therefore a first object of the present invention to provide a game apparatus for controlling and representing magical ability and power of a player character, in an action power control program.

It is a further object of the present invention to provide a game control method for controlling and representing magical ability and power of a player character, in an action power control program, represented on a display screen in a virtual basis.

It is yet a further object of the present invention to provide a computer-readable storage medium including computer program code for storing an action power control program for controlling and representing magical ability and power of a player character in the action power control program.

It is a even a further object of the present invention to provide a computer program product for controlling and representing magical ability and power of a player character in the action power control program through the use of a computing input device.

It is yet even a further object of the present invention to provide a game control method for controlling and representing magical ability and power of a player character, in an action power control program, represented on a display screen in a virtual basis, wherein the magical ability is graphically displayed on the display screen in the form of Bunsen burner flame.

Still another object of the present invention is to provide for a magical ability representation that is a physical part of the avatar's body.

And still anther object of the present invention is to provide numerical value ranges to player character types that represent a relative power value that is not known to the game player as a numerical number, but instead something that he learns from trial and error by inhabiting a certain type of character and through the use of the magical spell spigot.

Yet another object of the present invention is to provide a game viewing experience for the game player's avatar from either the first or third person perspective.

These and other objects of the present invention will become apparent when taking into consideration both the brief description of the drawings and detail description of the preferred embodiment both sequentially set forth below.

BRIEF DESCRIPTION OF THE DRAWINGS

The detailed description of the invention, contained herein below, may be better understood when accompanied by a brief description of the drawings, wherein:

FIG. 4C illustrates the same character encounter as that of FIGS. 4A and 4B, wherein the avatar continues to tap into the unlimited source of Magical Power to the same level, but still not exceeding his Magical Power abilities, for casting a Magical Spell against NPC$^1$ with further representation on how that Magical Spell finally affects the NPC$^1$'s Health to make him believe that he is about to die, which causes the NPC$^1$ Soul and Spirit to depart from his body and further how the avatar's Vitality is further effected by continuing to cast this specific Magical Spell to an almost critical level for the avatar;

FIG. 5A illustrates a discrete moment in time after the character encounter of FIGS. 4A-4C in a video game of the game apparatus and game control method for controlling and representing magical ability and power of a player character, in an action power control program, of the present invention, wherein a second character encounter occurs, but wherein the avatar has taken-over the body of NPC$^1$ of the character encounter illustrated in FIGS. 4A-4C such that the avatar now possesses the new Magical Power abilities and Vitality obtained from NPC$^1$, but also the NPC$^1$ health level at the time of the body take-over, and wherein further a second character encounter is occurring and the game player's avatar's new attributes of Magical Power, Health and Vitality are represented in a virtual environment on a display screen in defined quantities against a new and different character (NPC$^2$) having a defined quantity of Health and an obtainable quantity of Magical Power and Vitality that cannot be used by NPC$^2$, but which can be used by the avatar if he chooses to take-over the body of NPC$^2$ under certain conditions precedent;

FIG. 6A illustrates a new discrete moment in time after the character encounter of FIGS. 5A-5B in a video game of the game apparatus and game control method for controlling and representing magical ability and power of a player character, in an action power control program, of the present invention, wherein a third character encounter occurs, but wherein the avatar has taken-over the body of NPC$^2$ of the character encounter illustrated in FIGS. 5A-5B such that the avatar now possesses the new Magical Power abilities and Vitality obtained from NPC$^2$ along with the NPC$^2$ health level at the time of the body take-over, and further wherein the game player's avatar's new attributes of Magical Power, Health and Vitality are represented in a virtual environment on a display screen in defined quantities against two new and different opposing characters (NPC$^3$) and (NPC$^4$), each having their own defined quantities of Health and their own set of obtainable quantities of Magical Power and Vitality that cannot be used by either character, but which can be taken by the avatar if he chooses to take-over the body of one or the other of the two characters NPC$^3$ and NPC$^4$ under certain conditions precedent;

FIG. 6B illustrates the same character encounter as that of FIG. 6A, but wherein the avatar has tapped into the unlimited source of Magical Power to a certain new higher level than before, but which does not exceed the avatar's new higher Magical Power abilities, for casting a Magical Spell against NPC$^4$ that kills him, with further representation on how this particular Magical Spell affects (depletes) the avatar's newest level of Vitality;

DETAILED DESCRIPTION OF THE PREFERRED EMBODIMENT

Figure 1:
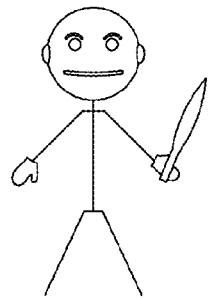
FIG. 1 illustrates a typical prior art representation in a video game of certain abilities and attributes of a game player's avatar, including Health, Fatigue and Magical Abilities/Power.
Figure 1:
Figure 1:
Figure 1:
Figure 2:
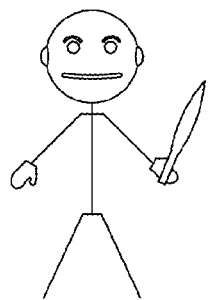
FIG. 2 illustrates those same prior art represented video game avatar abilities and attributes, and how they are depleted by a linear function when the avatar is engaged in combat against an enemy.
Figure 2:
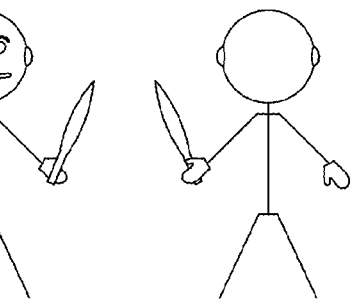
Figure 2:
Figure 2:
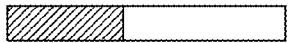
Figure 2:

Referring to FIGS. 1 and 2, it can be seen that the prior art uses a method to represent various attributes, such as Health, Fatigue and Magical Abilities/Power, of a player character in a video game with horizontal bars that move in along a linear scale based upon the events occurring in such game. By way of example, FIGS. 1 and 2 show how a typical avatar in a prior art game having a full Health, Fatigue and Magical Abilities/Power losses some amount of these attributes as he fights an enemy. Each strike of the sword of the enemy against the unprotected body of the avatar will affect his Health and each swing of the sword by the avatar or other movement of his body will affect his Fatigue. Finally, the use of any Magical Abilities/Powers that the avatar has will deplete his finite reserve of such until it is empty.

The present invention differs significantly from the aforementioned prior art in a multitude of various ways. First, in the game apparatus and game control method for controlling and representing magical ability and power of a player character, in an action power control program, of the present invention, there is no finite level of magic, which must be replenished and found by scourging through the scenes of the game. Instead, and referring to FIG. 3, an infinite quantity of magic is always present and available for channeling to any given player character, represented along the "x" axis. In the present invention of a game apparatus and game control method for controlling and representing magical ability and power of a player character, in an action power control program, it is possible for the player character to change bodies from the lowest of creatures (i.e., a rodent), to the highest of magical persons, such as an "Archmage" (a type of extremely powerful wizard, used within the context of a fantasy video game that utilizes the method of the present invention).

Figure 3:
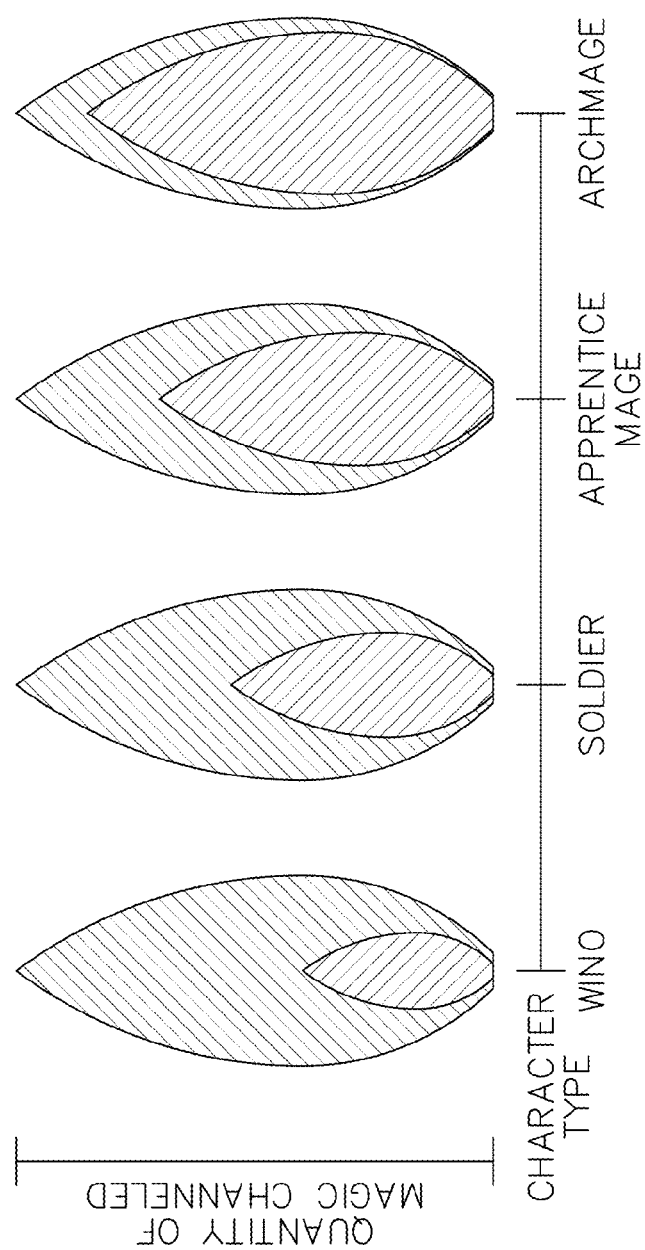
FIG. 3 illustrates examples of game character types (i.e., avatars) in a video game utilizing the game control method for controlling and representing magical ability and power of a player character, in an action power control program of the present invention, wherein a represented quantity of unlimited magic can be channeled at anytime during said action power control program (represented by the smaller of the two "flame-like" shapes) to said character, in combination with representation of how much effect that quantity of channeled magic has on the character type (i.e., how much "burn-off" or damage to the avatar's body, represented by the larger of the two "flame-like" shapes) in relation to an avatar attribute of Vitality.

Therefore, with continuing reference to FIG. 3, it can be seen that four types of player characters are represented (solely by way of example, as a multitude of other characters are employed) along the "y" axis; they include: a Wino, a Soldier, an Apprentice Mage and an Archmage. Each of these characters in the method of the present invention can utilize larger quantities of the unlimited quantity of magic that can be channeled, as compared to the "lesser character" below them. So, since some characters are not as strong as others, they do not have the same amount of Vitality, and therefore the quantity of channeled magic used can have a detrimental effect on those with lesser Vitality. By way of example, a Wino has less Vitality than a Soldier, who in turn has less Vitality than an Apprentice Mage, who in turn has less Vitality than an Archmage.

Again, with continuing reference to FIG. 3, a representation of how magic can be shown on a display screen that interfaces with either a computer or game console wherein the method for controlling and representing magical ability and power of a player character, in an action power control program, is shown. In particular, it is shown how a quantity of unlimited magic can be channeled at anytime during said action power control program (represented by the smaller of the two "flame-like" shapes) to said character, in combination with representation of how much effect that quantity of channeled magic has on the character type (i.e., how much "burnoff" or damage to the avatar's body, represented by the larger of the two "flame-like" shapes) in relation to the avatar's attribute of Vitality. This can also be shown, as used in an alternate embodiment, to be part of the avatar's body, wherein a spigot of unlimited magical can be tapped into. What is most important to understand from FIG. 3 is that the use of just a little bit of magic, say for example in a Wino, has a large and detrimental effect on his Vitality, which could lead to a quick death for the Wino. In contrast though, the use of a large amount of magic by an Archmage, even for long periods of time, can have very little, and in some cases almost non-existent, effect on his Vitality, permitting him to continuingly tap into the spigot and cast magic at will.

Figure 4A:
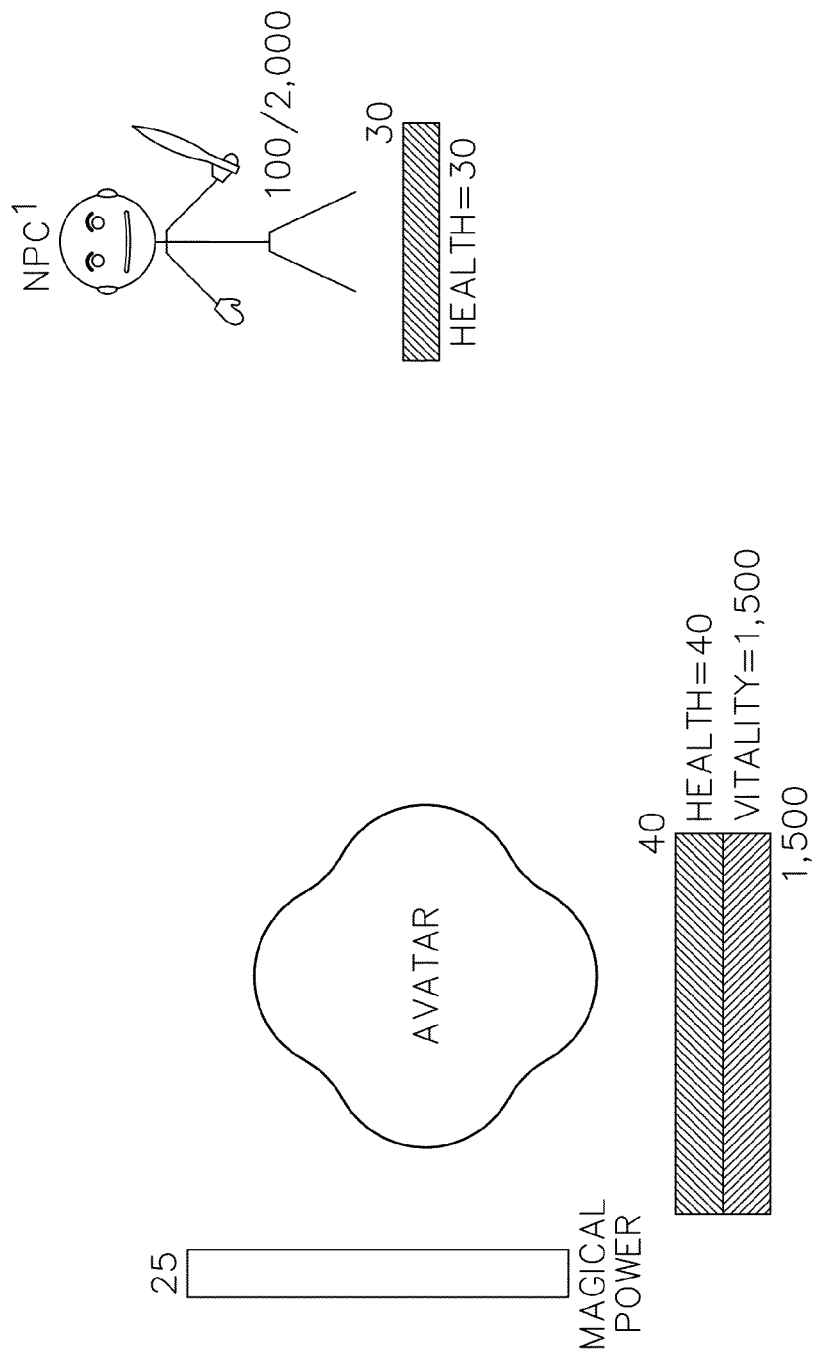
FIG. 4A illustrates a character encounter between an avatar and another character in a video game of the game apparatus and game control method for controlling and representing magical ability and power of a player character, in an action power control program, of the present invention, wherein the game player's avatar's attributes of Magical Power, Health and Vitality are represented in a virtual environment on a display screen in defined quantities against the other character (NPC$^1$) having a defined quantity of Health and an obtainable quantity of Magical Power and Vitality that cannot be used by NPC$^1$, but which can be taken by the avatar if he chooses to take-over (inhabit) the body of NPC$^1$ under certain conditions precedent.
Figure 4B:
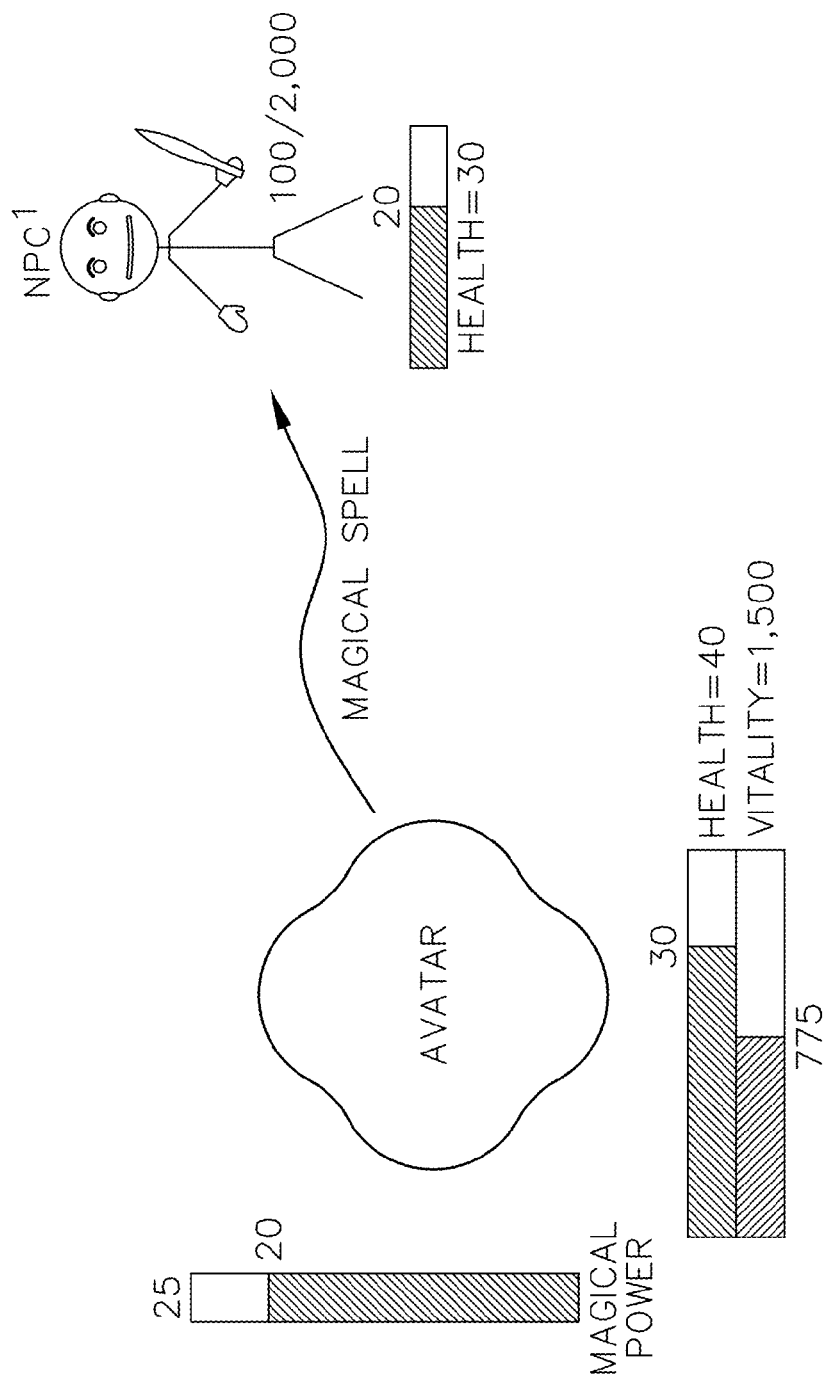
FIG. 4B illustrates the same character encounter as that of FIG. 4A, but wherein the avatar has tapped into the unlimited source of Magical Power to a certain level that does not exceed his Magical Power abilities for casting a specific Magical Spell against NPC$^1$, with further representation on how that Magical Spell affects the NPC$^1$'s Health and the avatar's Vitality (i.e., effect of depletion) by casting the specific Magical Spell.

Referring now to FIGS. 4A-4C, it is shown how the method of controlling the magical power is carried out in a video game of the game apparatus and game control method for controlling and representing magical ability and power of a player character, in an action power control program, of the present invention. In particular, a character encounter occurs between an avatar and another character, wherein the game player's avatar's attributes of Magical Power, Health and Vitality are represented in a virtual environment on a display screen in defined quantities against the other character (NPC$^1$) having a defined quantity of Health and an obtainable quantity of Magical Power and Vitality that cannot be used by NPC$^1$, but which can be taken by the avatar if he chooses to take-over (inhabit) the body of NPC$^1$ under certain conditions precedent. In this scenario, the avatar has a Magical Power ability of 25, a Health of 40 and a Vitality of 1,500. However, a Magical Power ability of 25 does not allow the avatar to channel large quantities of magic and in fact any magical spell that he uses by opening the spigot will more than likely deplete his Vitality quite quickly. In the preferred embodiment, utilizing the maximum amount of Magical Power (i.e., 25), will only provide the avatar with 30 seconds of life span to accomplish his task of killing or disabling his opponent NPC$^1$ before he dies and suffers whatever penalty that might entail. However, in FIGS. 4B and 4C, it can be seen that tapping into the spigot at about $\frac{4}{5}^{ths}$ of his capability (i.e., 20 of 25), he is able to defeat NPC$^1$ by making him think that NPC$^1$ is going to die, which causes his soul and spirit to depart, whereby the avatar can then jump into (i.e., inhabit) his body and take on the new levels of Magical Power abilities and Vitality of 100/2000, respectively. However, as shown in FIG. 5A, the avatar, now inhabiting NPC$^1$ also takes the current state of health of only 15 of a maximum of 30 while experiencing the next and new character encounter.

Figure 5B:
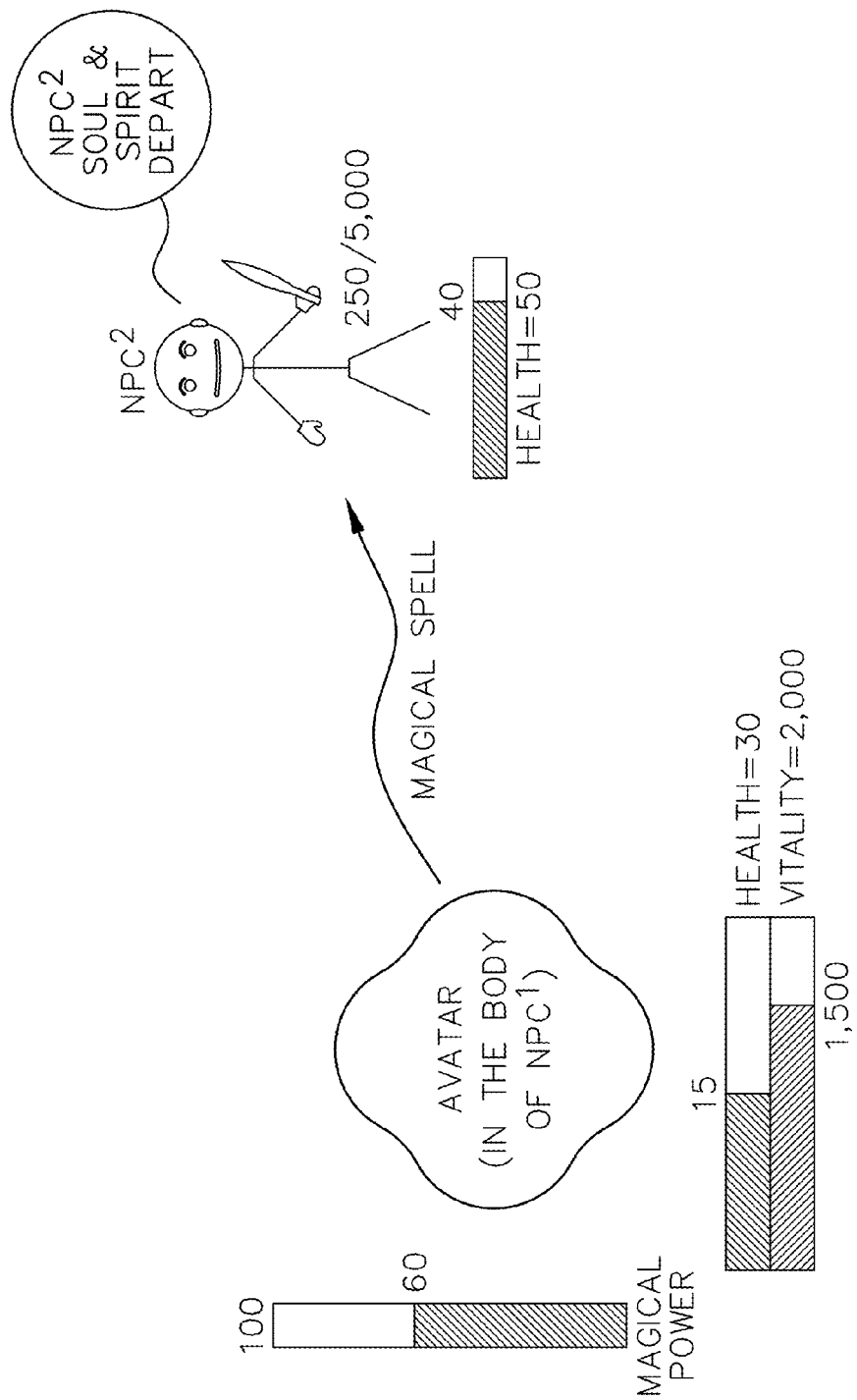
FIG. 5B illustrates the same character encounter as that of FIG. 5A, but wherein the avatar has tapped into the unlimited source of Magical Power to a certain higher level than before, but which does not exceed the avatar's new higher Magical Power abilities for casting a Magical Spell against NPC$^2$ and for making NPC$^2$ believe that he is about to die, which causes the NPC$^2$ Soul and Spirit to depart from his body, with further representation on how this particular Magical Spell affects (depletes) the avatar's new level of Vitality.

With reference now to FIG. 5B, the avatar has tapped into the unlimited source of Magical Power (the spigot) to a certain higher level than before (60 of 100), which does not exceed the avatar's new higher Magical Power abilities for casting a Magical Spell against NPC$^2$ and for making NPC$^2$ believe that he is about to die, which causes the NPC$^2$ Soul and Spirit to depart from his body. The effects on his body though can be seen as his Vitality drops from 2000 to 1,500. Notwithstanding, the avatar again jumps to a new body, that of NPC$^2$ and gains yet even a higher amount of Magical Power abilities and Vitality (250/5000, respectively). Again however, the avatar is forced to except the current state of health, which in this example, is 40 of 50.

Figure 6C:
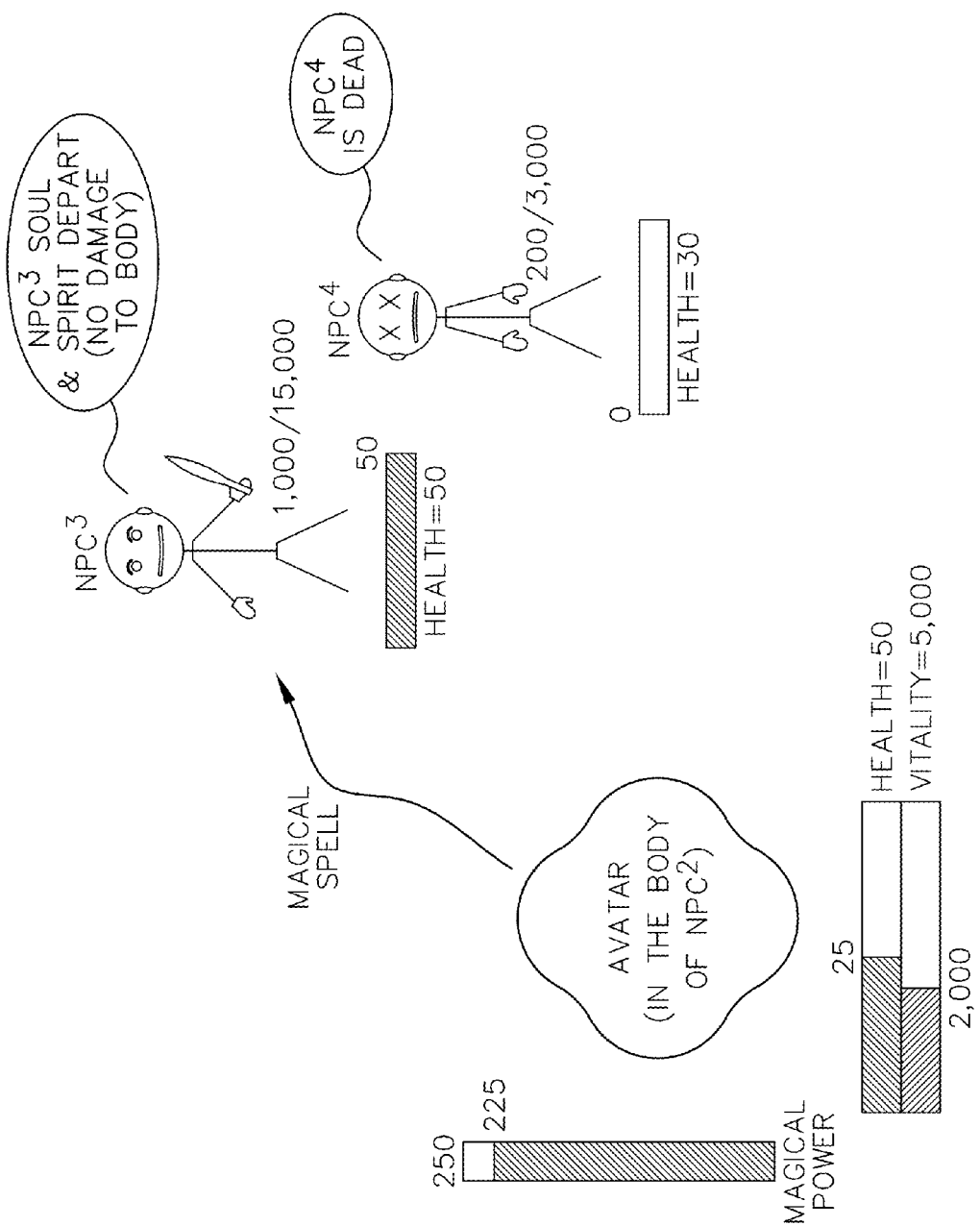
FIG. 6C illustrates the same character encounter as that of FIGS. 6A-6B, with NPC$^4$ dead, and wherein the avatar has tapped into the unlimited source of Magical Power to a certain even new higher level than before, but which still does not exceed the avatar's newest level of Magical Power abilities, for casting a Magical Spell against NPC$^3$, which makes NPC$^3$ believe that he is about to die, even though his Health has not been depleted (no damage to $NPC^3$ body) from its original level, but which causes the $NPC^3$ Soul and Spirit to depart from his body, with further representation on how this particular Magical Spell further affects (depletes) the avatar's newest level of Vitality, aggregated by casting two different Magical Spells for killing $NPC^4$ and for making $NPC^3$ believe that his death was imminent.

Referring now to FIGS. 6A-6C, a new encounter occurs wherein the avatar, having taken-over the body of NPC$^2$ from the previous encounter, now possesses the new Magical Power abilities and Vitality (250/500, respectively) along with the NPC$^2$ health level at 40 of 50. The avatar encounters two opposing characters (NPC$^3$) and (NPC$^4$), each having their own defined quantities of Health and their own set of obtainable quantities of Magical Power abilities and Vitality that cannot be used by either character, but which can be taken by the avatar if he chooses to take-over the body of one or the other of the two characters NPC$^3$ and NPC$^4$. In FIG. 6B it shows that the avatar has opened the spigot of Magical Power to a certain new higher level than before (150 of 250), but which does not exceed the avatar's new higher Magical Power abilities, for casting a Magical Spell against NPC$^4$ that kills him. The depletion of his Vitality is also shown as dropping from 5000 to 4000. In FIG. 6C, it shows the same character encounter as that of FIGS. 6A-6B, with NPC$^4$ dead, and wherein the avatar has tapped into the spigot of Magical Power to a certain even new higher level than before (225 of 250), which still does not exceed the avatar's newest level of Magical Power abilities, for casting a Magical Spell against NPC$^3$, which makes NPC$^3$ believe that he is about to die, even though his Health has not been depleted (no damage to NPC$^3$ body) from its original level. This causes the NPC$^3$ Soul and Spirit to depart from his body, but the Vitality of the avatar is depleted further down to 2000 from 5000.

Figure 7A:
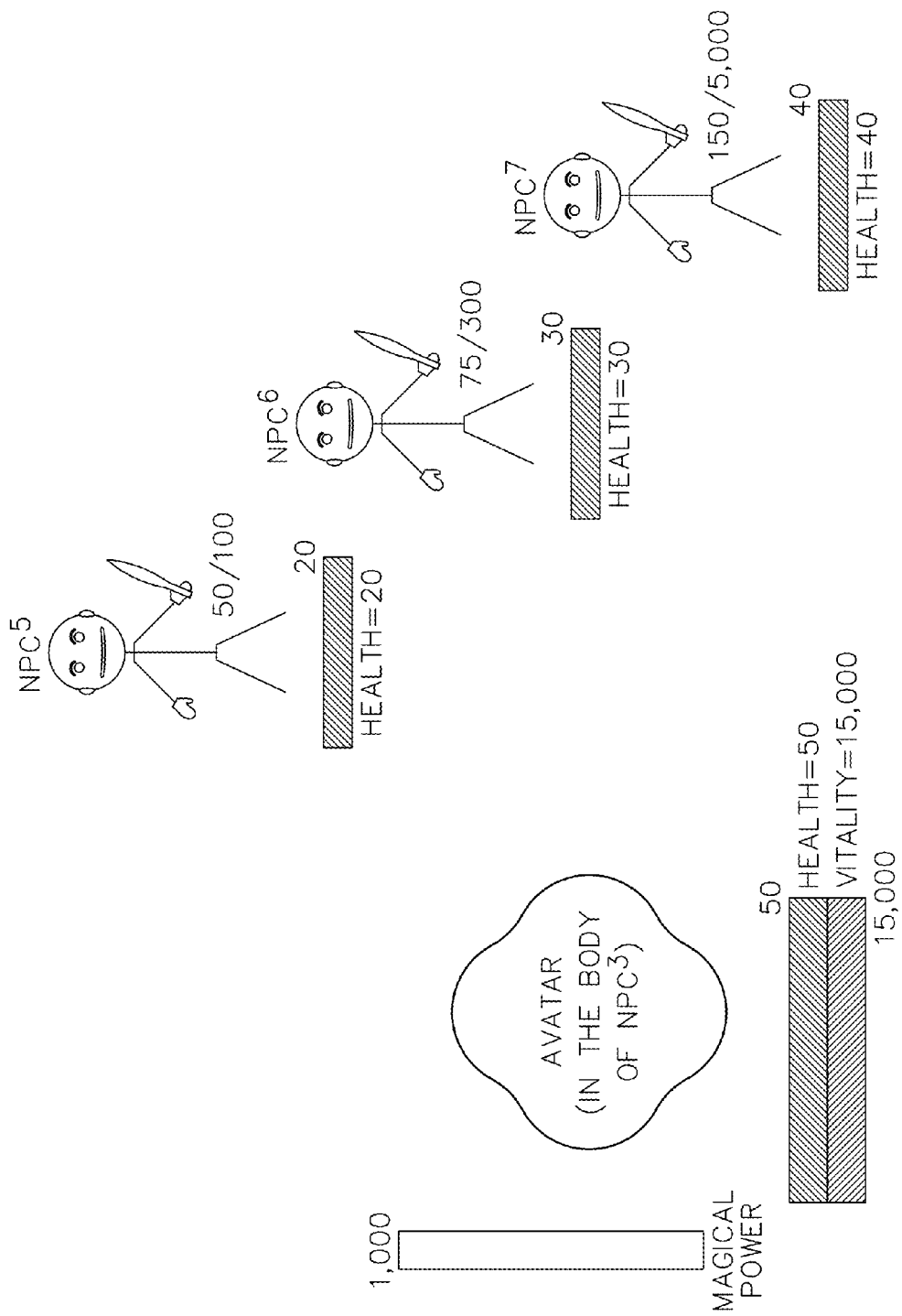
FIG. 7A illustrates a new discrete moment in time after the character encounter of FIGS. 6A-6C in a video game of the game apparatus and game control method for controlling and representing magical ability and power of a player character, in an action power control program, of the present invention, wherein a fourth character encounter occurs, and wherein the avatar has taken-over the body of $NPC^3$ of the character encounter illustrated in FIGS. 6A-6C such that the avatar now possesses yet a newer and higher level of Magical Power abilities and Vitality obtained from $NPC^3$, along with the full health of $NPC^3$, which still existed at the time of the body take-over by the avatar, and further wherein the game player's avatar's newest attributes of Magical Power, Health and Vitality are represented in a virtual environment on a display screen in defined quantities against three opposing characters ($NPC^5$), ($NPC^6$) and ($NPC^7$), each of the three encountered characters having their own defined quantities of Health and their own set of obtainable quantities of Magical Power and Vitality that cannot be used by any one of them, but which can be taken by the avatar if he chooses to take-over the body of any of the three characters $NPC^5$, $NPC^6$ and $NPC^7$ under certain conditions precedent.
Figure 7B:
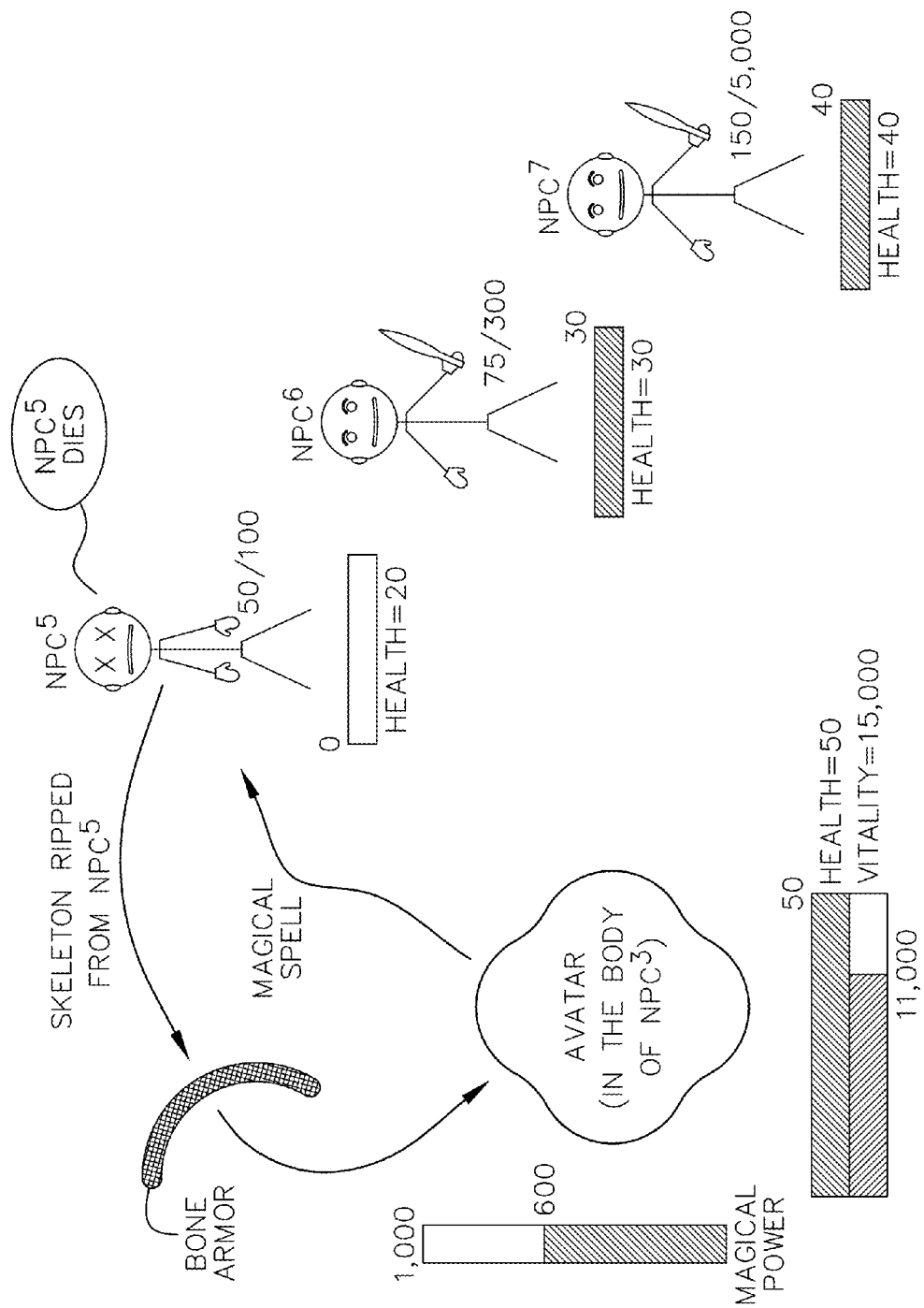
FIG. 7B illustrates the same character encounter as that of FIG. 7A, but wherein the avatar has tapped into the unlimited source of Magical Power to a certain yet even new higher level than before, but which does not exceed the avatar's newest higher level of Magical Power abilities, for casting a first Magical Spell against $NPC^5$ that kills him instantly by ripping his skeleton from his body and thereby creating an armor of bones for use by the avatar for protection against attack, with further representation on how this particular first Magical Spell affects (depletes) the avatar's newest level of Vitality.

Referring to FIGS. 7A-7D, yet another new encounter occurs for the avatar, having taken-over the body of NPC$^3$ from the previous encounter, he now possesses the new Magical Power abilities and Vitality (1,000/15,000, respectively) along with the NPC$^3$ health level at 50 of 50, since no damage to the NPC$^3$ body had occurred. The avatar encounters three opposing characters (NPC$^5$), (NPC$^6$) and (NPC$^7$) each having their own defined quantities of Health and their own set of obtainable quantities of Magical Power and Vitality that cannot be used by any of the non-player characters, but which can be taken by the avatar if he chooses to take-over the body of any one or the three encountered characters. In FIG. 7B it shows that the avatar has opened the spigot of Magical Power to a certain new higher level than before (600 of 1,000), but which does not exceed the avatar's new higher Magical Power abilities, for casting a Magical Spell against NPC$^5$ that kills him and in the process rips his skeleton from his body for use as Bone Armor to protect the avatar against the other two encountered characters. However, there has been some significant level of depletion to the avatar's Vitality because of the opening of the spigot to such a large level or relative percentage.

Figure 7C:
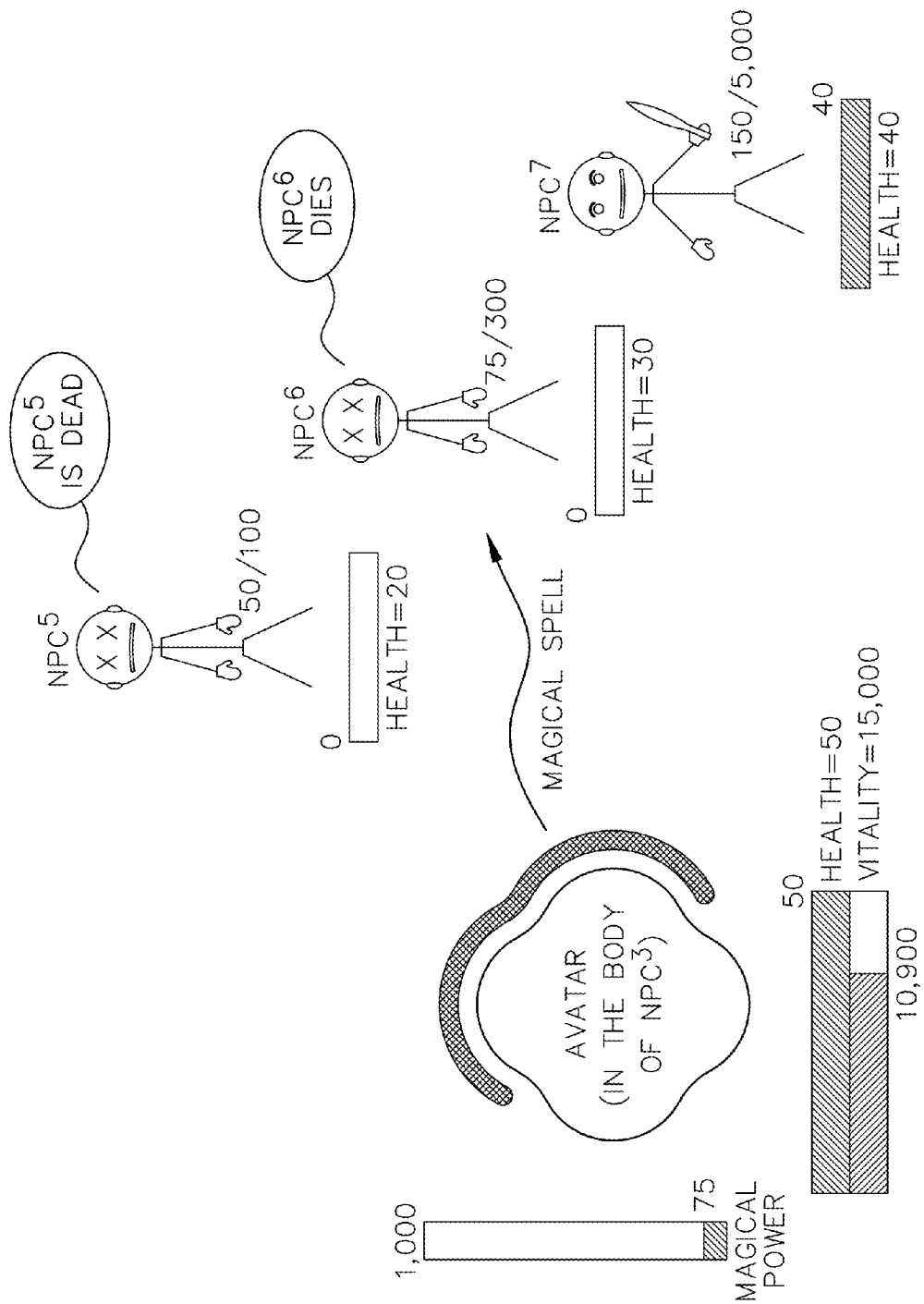
FIG. 7C illustrates the same character encounter as that of FIGS. 7A-7B, with $NPC^5$ dead, and wherein the avatar has tapped into the unlimited source of Magical Power to a certain low level, which does not approach the avatar's newest higher level of Magical Power abilities, for casting a second Magical Spell against $NPC^6$, which instantly kills him, with further representation on how this second Magical Spell further affects (depletes) the avatar's newest level of Vitality, aggregated by the killing of both $NPC^5$ and $NPC^6$, but also how the avatar's health is not affected by attack from $NPC^7$ due to the protection of the bone armor.
Figure 7D:
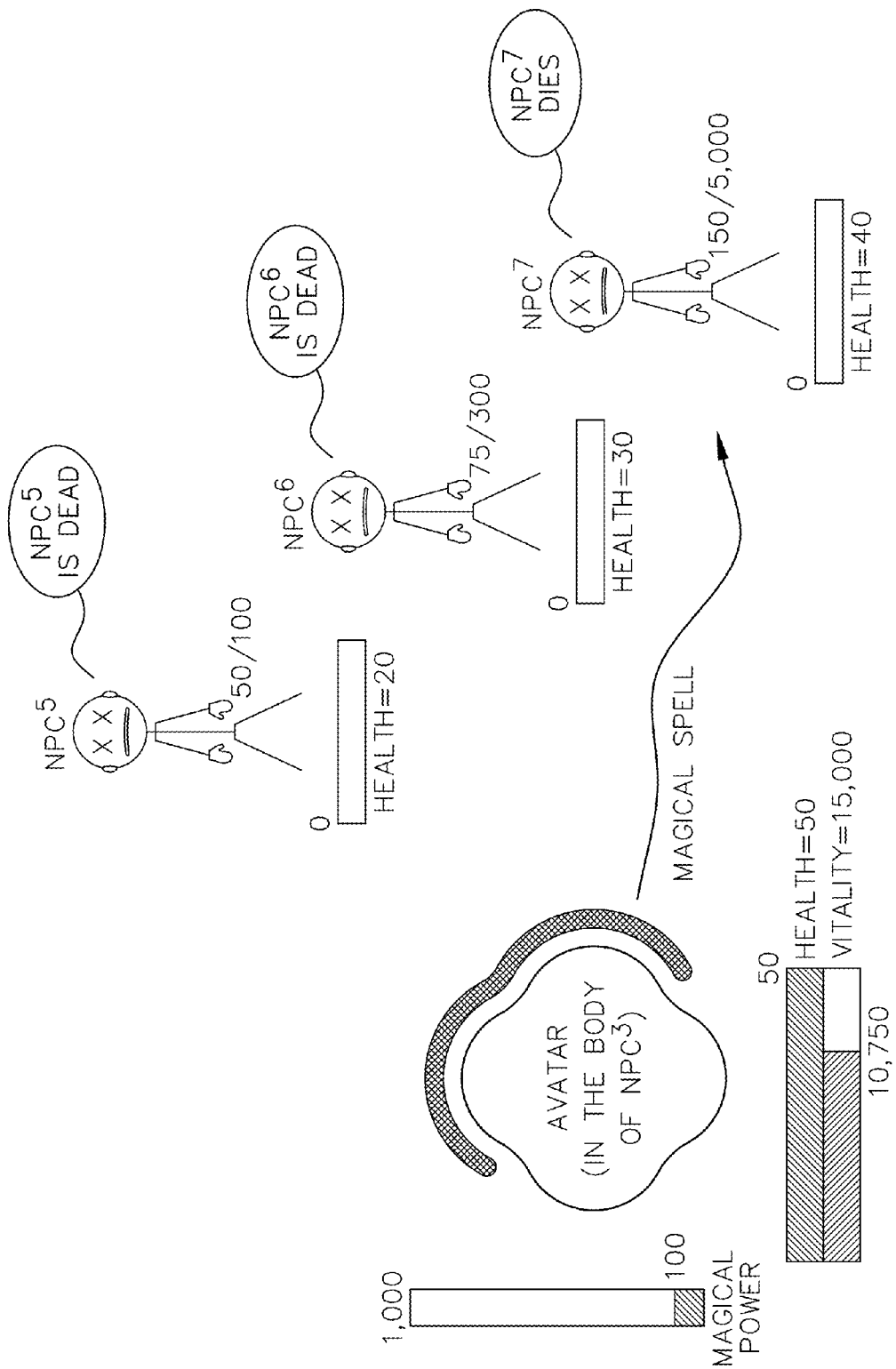
FIG. 7D illustrates the same character encounter as that of FIGS. 7A-7C, with both $NPC^5$ and $NPC^6$ dead, and wherein the avatar has tapped into the unlimited source of Magical Power to another certain low level, one which does not approach the avatar's newest level of high Magical Power abilities, for casting a third Magical Spell against $NPC^7$, which instantly kills him, along with further representation on how this third Magical Spell further affects (depletes) the avatar's newest level of Vitality, aggregated by the killing of all three characters $NPC^5$, $NPC^6$ and $NPC^7$.

Thereafter though, as shown in FIG. 7C, the avatar, with his Bone Armor in place, taps into the spigot of Magical Power to a fairly low level (75 of 1,000), which is more than adequate for casting a Magical Spell against NPC$^3$, which kills him, but which depletes the avatar's Vitality by very little (only down to 10,900 from the previous level of 11,000). Then, as shown in FIG. 7D, the avatar directs his attention to NPC$^7$ and again taps into the spigot of Magical Power to a fairly low level (100 of 1,000) to quickly kill NPC[7], which also has very little effect on the avatar's Vitality (down to 10,750 from the previous amount of 10,900).

Figure 8:
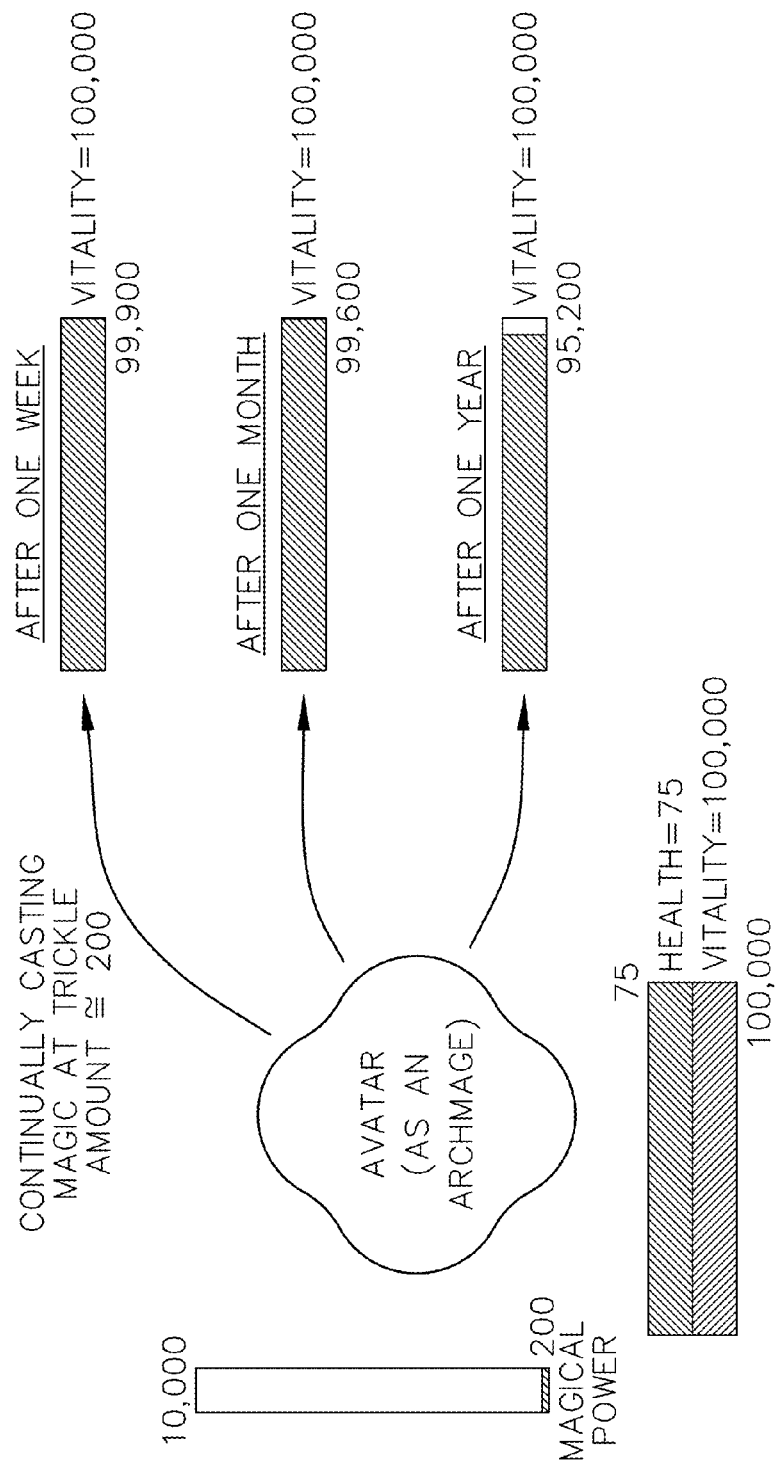
FIG. 8 illustrates an avatar possessing extremely high levels of Vitality and Magical Power, who can continually cast magic over long periods of time such that his Vitality is barely affected (a negligible amount) over one week, one month or even one year.

Referring now to FIG. 8, this diagram illustrates that in the method of the present invention that an avatar possessing extremely high levels of Vitality (100,000) and Magical Power abilities (10,000), can continually cast relatively effective (albeit a trickle as compared to the levels he could cast) magic over long periods of time while barely affecting his Vitality (a negligible level, at best) over one week (depleted only by 100 when casting Magical Power at a level of 200), one month (depleted only by 400 when casting the same Magical Power) or even one year (depleted only by 4,800 when again casting the same Magical Power).

Figure 9:
FIG. 9 illustrates an avatar in a video game utilizing the action power control program and method of the present invention wherein the a magical spell spigot has been opened and the effects of such use are shown affecting the body of said avatar.
Figure 10:
FIG. 10 is a detail view of FIG. 9.

Referring to FIGS. 9 and 10, an alternate embodiment of the representation of the avatar's magical powers and how they affect his body is shown (i.e., how it is displayed to the game player by a third party perspective view). In particular, a visual representation (like a glow), emanates from the back of the neck of the player character. The glow is almost completely invisible when the spigot is at a minimal setting. It then transitions to a large bright flare when completely open. The glow radiates outward like white glowing veins through the body. This method is used as a combination of factors through the player character and any follow cameras. On the game controller, or on any other computing input device, as the spigot opens the camera is affected by the use of shake (along with player controller rumble), motion blur and depth of field. All these elements combine to give the sense of power utilized when opening up the spigot for the third party perspective alternate embodiment.

The Spell Spigot is what the player uses in the video game utilizing the method of the present invention to determine the size and power rating of the spell that they can cast. The spigot is opened and closed by affecting pressure on any one of a number of different buttons on a typical game console controller or other computing input device. The Spell Spigot itself is limited by the body type that the player inhabits— either from a very lowly drunk (extremely limited) up to a highly powerful Archmage (full power). The Spell Spigot is also directly tied to the lifespan of the body as it drains the life force when a player casts a spell. The more that the spigot is open, the more powerful the spell becomes but also the faster the drain on the current body life force (leading to a shorter lifespan). Examples of such where illustrated in FIGS. 4A through 7D. It should be noted that in the preferred embodiment, visually the Spell Spigot will be accomplished with the use of 2D HUD ("head-up display") elements for the player to decipher. Only in the alternate embodiment of the third person perspective will all the elements be imbedded in the playable character on the video display screen, as discussed above and as shown by way of example in FIGS. 9 and 10.

Further to the Spell Spigot, it essentially has two functions: (1) the Size of the Effect (the visual effects); and (2) the Absolute Power Rating (the damage inflicted). The Spell Spigot has a Spigot Cap that limits how much the player may open the spigot which is determined by what type of body the player has chosen to inhabit. By way of example, a street dwelling drunk has a very low Spigot Cap while a Mage has a very high Spigot Cap.

Figure 11:
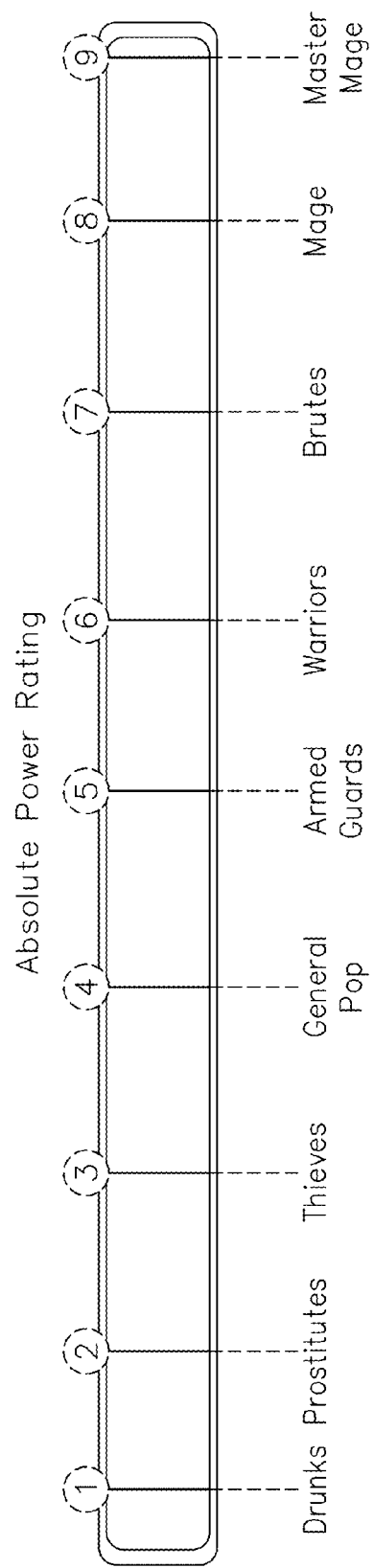
FIG. 11 illustrates a multitude of absolute power ratings that can be used with various types of player characters in a video game utilizing the action power control program and method of the present invention.

Referring now to FIG. 11, an example of Absolute Power Rating is shown, wherein regardless of the actual numerical value that will be implemented of true damage inflicted, the power rating is deterministic. Once a game player recognizes each type of body, they will then understand that a Drunk Type isn't as good as a Thief Type. In a preferred embodiment there are nine power rating levels. However, alternate embodiments permit a greater or lesser number of power rating levels if so needed to accommodate a greater or lesser number of game character body types. In the preferred embodiment of FIG. 11, there are Drunks, Prostitutes, Thieves, General Population, Armed Guards, Warriors, Brutes, Mages and Master Mages.

The Size of the Effect used visually in the alternate embodiment of the third person perspective changes as the game player opens the spigot to higher levels. The actual look of the effect, or the effect itself, does not necessarily matter, as there will be many magical spells that work in the same manner and display the same size and type of effect.

Figure 12:
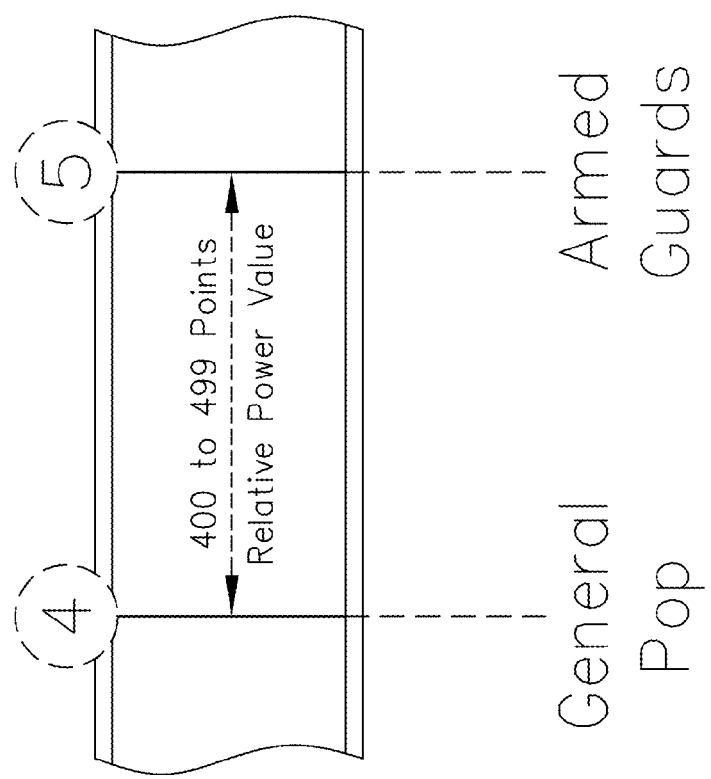
FIG. 12 is a detail view between two power ratings as seen in FIG. 11, wherein the numerical values that are programmed for a given game character type are shown, but which are unknown to a game player of a video game utilizing the action power control program and method of the present invention.

Referring now to FIG. 12, a Relative Power Value is established between each character type, which is the actual numbers that are used to calculate damage inflicted upon an opponent and damage received to the avatar. These numbers can include a multitude of varying ranges and are not visible to the game player in a video game utilizing the method of the present invention. FIG. 12 (400 to 490 points) is merely illustrative of one of a plurality of numerical ranges.

Figure 13:
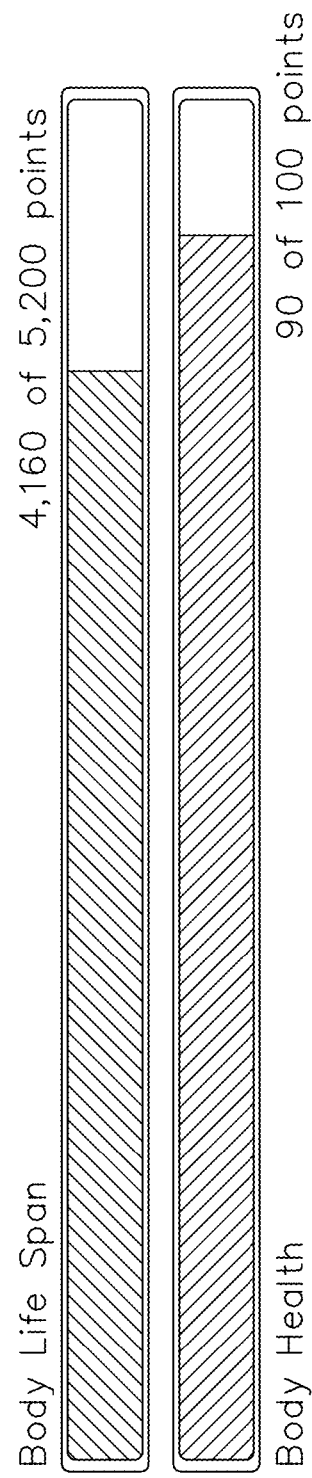
FIG. 13 illustrates Body Lifespan (Vitality) and Body Health of a game player's avatar in a video game utilizing the action power control program and method of the present invention, which are pieces of functionality relative to use of magic (Body Lifespan) and sustained attacks (Body Health), of which cannot be "refilled."

Referring to FIG. 13, the Body Life Span (also known as Vitality) and the Body Health are both illustrated. The Relative Power Value used by the game player is directly connected to draining the magic power from the inhabited body's total amount of magic power. This type of magic power is referred to as the Lifespan and losing this Lifespan is referred to as the Body Drain. The body's actual health (from taking physical damage through physical attacks) is a separate piece of functionality. Neither of these two items can be refilled; once it is used up, it's gone. The player must find another body to inhabit to regain Body Life Span and Body Health. In the alternate embodiment third person perspective, as the Lifespan is drained from the body, it is represented to the game player by the game player's character's body deteriorating. The body starts by looking "normal" and upon draining, the body slowly morphs down to a mummified skeleton. When the body gets close to being destroyed, it begins to smoke and then eventually catches on fire. If the player empties out the Body Lifespan, the body is destroyed and the player suffers whatever penalty the game designers create, such as reverting to a lowering being with less power.

The deterioration effect, as described above, is also used in the first person perspective preferred embodiment. However, only those body parts that can be seen from such first person perspective show the effect.

Further, equivalent steps can be substituted for ones set forth herein to achieve the same results in the same way and in the same manner.

Having thus described the present invention in the detailed description of the preferred embodiment, what is desired to be obtained in Letters Patent is:

1. A method of controlling action power of a player character in a video game wherein control of a computing input device interfacing with said method causes a representation of magical power to be displayed on a display screen on a virtual basis, the steps of the method comprising:
 a) accessing an unlimited level of magical power available to the player character by affecting a first control button on the computing input device;
 b) determining a proper amount of the unlimited level of magical power based upon the player character's known abilities and vitality by affecting a second control button on the computing input device; and
 c) utilizing said proper amount of the unlimited level of magical power against at least one other character within the video game to obtain a desired result against said at least one other character before a detrimental effect causes a penalty to the player character.

2. The method of controlling action power of a player character in a video game according to claim 1, wherein said video game is operated on a device chosen from the group consisting of a personal computer, a gaming console and a standalone arcade-type computerized apparatus.

3. The method of controlling action power of a player character in a video game according to claim 2, wherein the video game is played on computer network with at least two game players and at least two player characters.

4. The method of controlling action power of a player character in a video game according to claim 1, wherein the detrimental effect to the player character occurs within 30 seconds.

5. The method of controlling action power of a player character in a video game according to claim 1, wherein the effects to the vitality of the player character through the use of the magical power is represented on the display screen in the virtual basis separate from the player character.

6. The method of controlling action power of a player character in a video game according to claim 1, wherein the effects to the vitality of the player character through the use of the magical power is represented on the display screen in the virtual basis on the player character.

7. The method of controlling action power of a player character in a video game according to claim 6, wherein the effects to the vitality of the player character through the use of the magical power represented on the display screen in the virtual basis on the player character is displayed upon a body back side of the player character.

8. A computer-readable storage medium including computer program code for storing an action power control program wherein control of a computing input device interfacing with said computer-readable storage medium causes a representation of magical power to be displayed on a display screen on a virtual basis, said computer-readable storage medium comprising:
   a) a first interfacing control input on said computing input device for accessing an unlimited level of magical power available to the player character;
   b) a displayable representation of an amount of the accessible unlimited level of magical power based upon the player character's known abilities and vitality displayed in response to affecting the first interfacing control input; and
   c) a second interfacing control input on said computing input device for utilizing said amount of the accessible unlimited level of magical power against at least one other character within the action power control program to obtain a desired result against said at least one other character before a detrimental effect causes a penalty to the player character.

9. A game apparatus including computer program code located on a computer-readable storage medium for storing an action power control program having at least one player character wherein control of a computing input device interfacing with said game apparatus causes a representation of magical power to be displayed on a display screen on a virtual basis, said game apparatus comprising:
   a) the computing input device, the computer-readable storage medium and the display screen all communicating with one another to activate the action power control program for visual display and control thereof by a game player;
   b) means for accessing an unlimited level of magical power available to the at least player character by affecting a first control button on the computing input device by the game player;
   c) means for determining a proper amount of the unlimited level of magical power to use based upon known abilities and vitality of the at least one player character by affecting a second control button on the computing input device by the game player; and
   d) means for utilizing said proper amount of the unlimited level of magical power against at least one other character within the action power control program to obtain a desired result against said at least one other character before a detrimental effect causes a penalty to the at least one player character.

10. A computer program product for controlling action power of a player character in a video game, the video game being arranged for representing an unlimited amount of magical power to be displayed on a display screen on a virtual basis, said computer program product comprising:
   a) means for accessing the unlimited amount of magical power available to the player character by affecting a first control button on a computing input device interfacing with said computer program product;
   b) means for determining a proper amount of the unlimited amount of magical power based upon known abilities and vitality of the player character by affecting a second control button on the computing input device interfacing with said computer program product; and
   c) means for utilizing said proper amount of the unlimited amount of magical power against at least one other character within the video game to obtain a desired result against said at least one other character before a detrimental effect causes a penalty to the player character.

11. The computer program product according to claim 10, operated on a device chosen from the group consisting of a personal computer, a gaming console and a standalone arcade-type computerized apparatus.

12. The computer program product according to claim 10, wherein the detrimental effect to the player character occurs within 30 seconds.

13. The computer program product according to claim 12, wherein the effects to the vitality of the player character through the use of the magical power is represented on the display screen in the virtual basis separate from the player character.

14. The computer program product according to claim 12, wherein the effects to the vitality of the player character through the use of the magical power is represented on the display screen in the virtual basis on the player character.

15. The computer program product according to claim 14, wherein the effects to the vitality of the player character through the use of the magical power represented on the display screen in the virtual basis on the player character is displayed upon a body back side of the player character.

* * * * *